(12) United States Patent (10) Patent No.: US 11,466,838 B2
Hong et al. (45) Date of Patent: Oct. 11, 2022

(54) MULTI-FLEXIBLE DISPLAY DEVICE HAVING IMPROVED IMAGE DISCONTINUITY AT PANEL BOUNDARY AND METHOD OF MANUFACTURING DOUBLE-SIDED REFLECTOR THEREFOR

(71) Applicant: Seoul National University R&DB Foundation, Seoul (KR)

(72) Inventors: Yongtaek Hong, Seoul (KR); Seung Hwan Lee, Seongnam-si (KR); Hyung Soo Yoon, Seoul (KR); Byoung Ho Lee, Seoul (KR); Chan Hyung Yoo, Seoul (KR); Dong Yeon Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 201 days.

(21) Appl. No.: 16/780,924

(22) Filed: Feb. 4, 2020

(65) Prior Publication Data

US 2020/0271835 A1 Aug. 27, 2020

(30) Foreign Application Priority Data

Feb. 27, 2019 (KR) ........................ 10-2019-0023018

(51) Int. Cl.
*G09F 9/30* (2006.01)
*G06F 1/16* (2006.01)
(Continued)

(52) U.S. Cl.
CPC .............. *F21V 7/04* (2013.01); *F21V 7/0083* (2013.01); *F21V 13/14* (2013.01); *G06F 1/1641* (2013.01); *G09F 9/301* (2013.01)

(58) Field of Classification Search
CPC ............. H01L 51/5262; H01L 51/5271; H01L 27/3293; G06F 1/1641; G02F 1/13336
See application file for complete search history.

(56) References Cited

U.S. PATENT DOCUMENTS 7,942,546 B2   5/2011   Naijo et al.
9,575,241 B2   2/2017   Park
(Continued)

FOREIGN PATENT DOCUMENTS

JP   11-249131 A   9/1999
JP   2010-198907 A   9/2010
(Continued)

OTHER PUBLICATIONS

Non-final office action dated Nov. 2, 2020 from Korean Industrial Property Office for Korean Application No. 10-2019-0023018.
(Continued)

*Primary Examiner* — Mariceli Santiago
(74) *Attorney, Agent, or Firm* — Insight Law Group, PLLC; Seung Lee

(57) ABSTRACT

Provided are a multi-flexible display device having improved image discontinuity at a panel boundary, and a method of manufacturing a double-sided reflector therefor. An image discontinuity phenomenon at a boundary between panels of a multi-flexible display device manufactured by tiling a plurality of flexible displays including a bendable panel may be easily and simply ameliorated using a double-sided reflector capable of being manufactured through a simple process and at low cost.

4 Claims, 7 Drawing Sheets

(51) Int. Cl.
*F21V 7/00* (2006.01)
*F21V 13/14* (2006.01)
*F21V 7/04* (2006.01)

(56) References Cited

U.S. PATENT DOCUMENTS

| | | | |
|---|---|---|---|
| 10,416,950 B2 | 9/2019 | Kim et al. | |
| 2014/0354920 A1 | 12/2014 | Jang et al. | |
| 2015/0286457 A1* | 10/2015 | Kim | G02B 3/0037 |
| | | | 345/581 |

FOREIGN PATENT DOCUMENTS

| | | |
|---|---|---|
| JP | 2015-176031 A | 10/2015 |
| JP | 2018-017747 A | 2/2018 |
| KR | 10-2001-0065029 A | 7/2001 |
| KR | 10-2008-0083017 A | 9/2008 |
| KR | 10-2014-0139844 A | 12/2014 |
| KR | 10-2015-0116218 A | 10/2015 |
| KR | 10-2016-0099999 A | 8/2016 |

OTHER PUBLICATIONS

Notice of Allowance dated May 18, 2021 from Korean Industrial Property Office for Korean Application No. 10-2019-0023018.

* cited by examiner

MULTI-FLEXIBLE DISPLAY DEVICE HAVING IMPROVED IMAGE DISCONTINUITY AT PANEL BOUNDARY AND METHOD OF MANUFACTURING DOUBLE-SIDED REFLECTOR THEREFOR

CROSS-REFERENCE TO RELATED APPLICATION(S)

This application claims priority from Korean Patent Application No. 10-2019-0023018, filed on Feb. 27, 2019, in the Korean Intellectual Property Office, the disclosure of which is incorporated herein by reference in its entirety.

BACKGROUND

1. Field

The following description relates to a multi-flexible display device in which a plurality of flexible display panels are tiled, and more particularly, to a multi-flexible display device having improved image discontinuity at a panel boundary, and a method of manufacturing a double-sided reflector therefor.

2. Description of Related Art

In general, display devices, such as liquid crystal display (LCD) devices and organic light-emitting diode (OLED) devices, easily implement high resolution and have various advantages as large screen display devices. However, when the display devices are manufactured as large-area display devices having a certain size or more, excessive costs are required, and defects such as a reduction in image quality occur due to a signal delay or the like.

In order to overcome such problems, technology for implementing a large display device by tiling a plurality of small-area display devices has emerged. The technology is called tiled display or multi-display technology. The multi-display technology is one of core technologies for implementing large-area display devices and is used in outdoor advertisement display devices installed on roofs of buildings, large electronic scoreboards installed in sports complexes or the like, live display devices used in concerts, and the like.

In the case of a multi-display device in which a plurality of small-area display devices are tiled, an image discontinuity phenomenon occurs in which an image is discontinuous at a boundary between panels of the small-area display devices. Therefore, a separate structure is required to ameliorate the image discontinuity phenomenon at the boundary between the panels.

Korean Patent Publication No. 10-2014-0139844 (Dec. 8, 2014) proposes technology for preventing a phenomenon in which an image is discontinuous and distorted at an edge between a plurality of display panels by using an optical member to display an image from a portion of a display area of a multi-panel display device in a non-display area.

In such related art, an image discontinuity phenomenon at a boundary between panels has been ameliorated through a method in which light in a display area is refracted to a non-display area by installing an optical refractor such as a lens or a prism at a bezel at a boundary between panels, a method in which light in a display area is propagated to a non-display area through an optical waveguide, or a method in which a width of a bezel is physically reduced through miniaturization of wiring or the like.

However, the physical reduction in the width of the bezel has a limitation in a process, the use of the optical waveguide requires high process costs, and the use of the optical refractor such as the lens or the prism greatly limits a range of a viewing angle. In addition, until now, technology for ameliorating an image discontinuity phenomenon at a boundary between panels has been applied only in flat panel displays.

Accordingly, the present inventors have studied new technology for ameliorating an image discontinuity phenomenon at a boundary between panels of a multi-flexible display device manufactured by tiling a plurality of flexible displays including a bendable panel, such as curved displays in which a panel boundary forms a curved surface and rollable displays in which a panel is wound on a roller, other than flat displays.

PRIOR ART DOCUMENT

[Patent Document] Korean Patent Publication No. 10-2014-0139844 (Dec. 8, 2014)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a multi-flexible display device in which an image discontinuity phenomenon at a boundary between panels of a multi-flexible display device manufactured by tiling a plurality of flexible displays including a bendable panel may be easily and simply ameliorated using a double-sided reflector capable of being manufactured through a simple process and at low cost.

In addition, the following description relates to a method of manufacturing a double-sided reflector for a multi-flexible display device, the method being capable of manufacturing a double-sided reflector for a multi-flexible display device through a simple process and at low cost, wherein the double-sided reflector is installed at a boundary between panels of a multi-flexible display device manufactured by tiling a plurality of flexible displays including a bendable panel to ameliorate an image discontinuity phenomenon at the boundary between the panels.

In one general aspect, a multi-flexible display device having improved image discontinuity at a panel boundary includes a plurality of flexible panels spaced apart from each other and tiled such that bent portions at panel boundaries are opposite to each other, and a double-sided reflector disposed between the plurality of flexible panels and configured to convert a path of light output from each of the bent portions at the panel boundaries between the tiled flexible panels to ameliorate an image discontinuity phenomenon at the panel boundaries between the plurality of tiled flexible panels.

In an additional aspect, the double-sided reflector may include concave mirrors formed on both surfaces thereof, which face the bent portions at the panel boundaries between the flexible panels, and may convert the path of light by reflecting the light output from each of the bent portions at the panel boundaries between the flexible panels.

In an additional aspect, the bent portion at the panel boundary between the flexible panels may be positioned outside a focal point of the concave mirror formed on each of the both surfaces of the double-sided reflector so that image inversion occurs.

In an additional aspect, the bent portion at the panel boundary between the flexible panels may not be positioned at a focal point of the concave mirror formed on each of the both surfaces of the double-sided reflector so that an image divergence does not occur.

In an additional aspect, one ends of the concave mirrors formed on the both surfaces of the double-sided reflector may be in contact with each other so that image discontinuity does not occur.

In an additional aspect, the other ends of the concave mirrors formed on the both surfaces of the double-sided reflector may be in close contact with ends of light-emitting surfaces of the bent portions at the panel boundaries so that image blur due to movement does not occur.

In another aspect, a method of manufacturing a double-sided reflector for a multi-flexible display device having improved image discontinuity at a panel boundary includes a mold manufacturing operation of manufacturing a mold in which two cylinders are attached to each other, a main body manufacturing operation of manufacturing a main body having two concave mirror shapes of which one ends are in contact with each other by injecting a molten transparent thermosetting polymer into the mold, in which the two cylinders are attached to each other, manufactured in the mold manufacturing operation, and curing the injected molten transparent thermosetting polymer, and a double-sided reflector manufacturing operation of manufacturing a double-sided reflector by applying a metal having high reflectivity on surfaces of the two concave mirror shapes of the main body manufactured in the main body manufacturing operation.

In an additional aspect, the method may further include, prior to the applying of the metal having high reflectivity on the surfaces of the two concave mirror shapes of the main body manufactured in the main body manufacturing operation, a pretreatment operation of performing pretreatment in order to uniformly apply the metal having high reflectivity.

In an additional aspect, in the pretreatment operation, an oxygen plasma treatment may be performed on the surfaces of the two concave mirror shapes of the main body.

In an additional aspect, in the double-sided reflector manufacturing operation, the double-sided reflector may be manufactured by applying the metal having high reflectivity on the surfaces of the two concave mirror shapes of the main body through thermal evaporation or applying a metal ink having high reflectivity on the surfaces of the two concave mirror shapes of the main body through dip coating.

DETAILED DESCRIPTION

Figure 1:
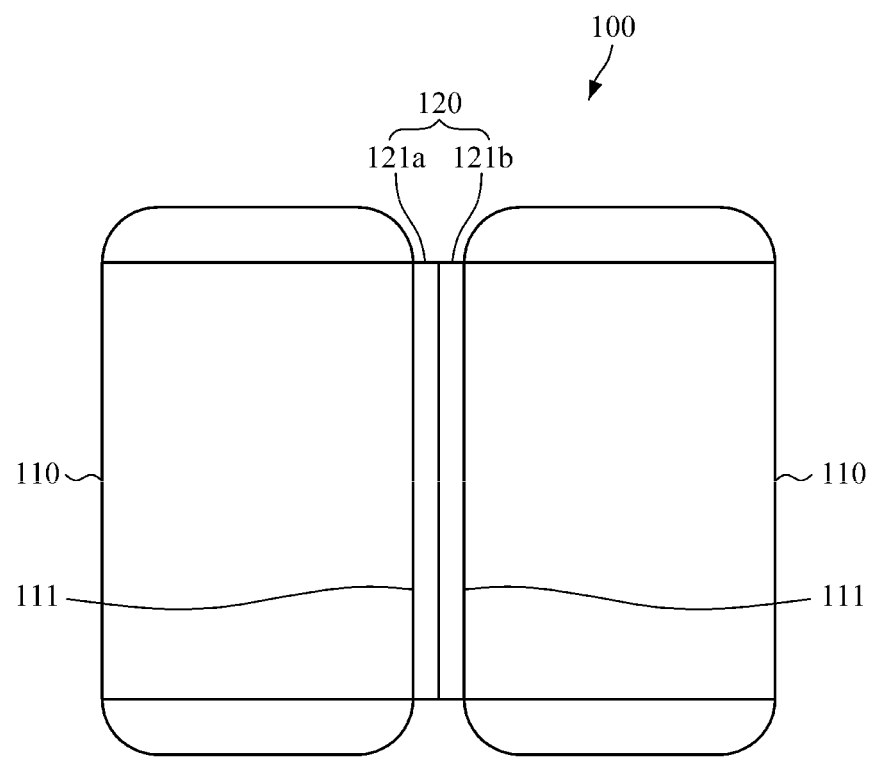
FIG. 1 is a view illustrating a multi-flexible display device having improved image discontinuity at a panel boundary according to one exemplary embodiment of the present invention.

Hereinafter, in order to facilitate understanding and reproducing the present invention by those skilled in the art, the present invention will be described in detail by explaining exemplary embodiments with reference to the accompanying drawings. Specific exemplary embodiments are shown in the drawings and the relevant detailed descriptions are given in corresponding sections, but there is no intention to limit various exemplary embodiments of the present invention to the particular forms disclosed herein.

In the description of the present invention, when it is determined that the detailed descriptions on a related known function or configuration may unnecessarily obscure the gist of the exemplary embodiments of the present invention, the detailed descriptions thereof will be omitted.

In case that one component is mentioned as being "connected" or "linked" to another component, it may be connected or linked to the corresponding component directly or other component(s) may be present therebetween.

On the other hand, in case that one component is mentioned as being "directly connected" or "directly linked" to another component, it should be understood that other component(s) are not present therebetween.

A multi-flexible display device refers to a large-area flexible display device manufactured by tiling a plurality of flexible displays including a bendable panel, such as curved displays in which a panel boundary forms a curved surface and rollable displays in which a panel is wound on a roller.

FIG. 1 is a view illustrating a multi-flexible display device having improved image discontinuity at a panel boundary according to one exemplary embodiment of the present invention. As shown in FIG. 1, a multi-flexible display device 100 having improved image discontinuity at a panel boundary according to the present invention includes a plurality of flexible panels 110 and a double-sided reflector 120.

The plurality of flexible panels 110 are disposed to be spaced apart from each other and are tiled such that bent portions 111 at panel boundaries are opposite to each other. In this case, the flexible panel 110 may be a panel of a curved display in which a panel boundary forms a curved surface or a panel of a rollable display in which a panel is wound on a roller.

The double-sided reflector 120 is disposed between the plurality of flexible panels 110 and converts a path of light output from each of the bent portions 111 at the panel boundaries between the tiled flexible panels, thereby ameliorating an image discontinuity phenomenon at a panel boundary between the plurality of flexible panels.

Figure 2:
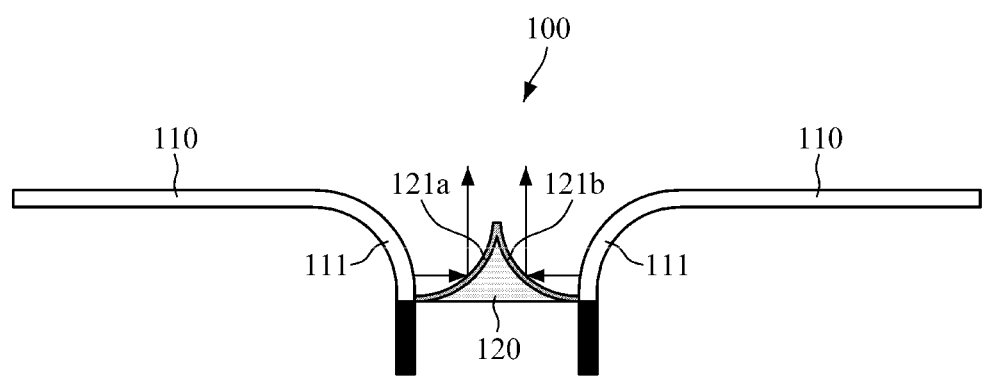
FIG. 2 is a cross-sectional view illustrating a configuration of a double-sided reflector for a multi-flexible display device having improved image discontinuity at a panel boundary according to one exemplary embodiment of the present invention.
Figure 3:
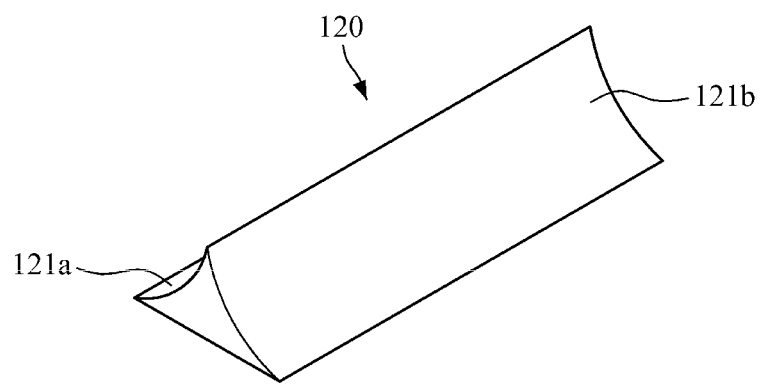
FIG. 3 is a perspective view illustrating the configuration of the double-sided reflector for a multi-flexible display device having improved image discontinuity at a panel boundary according to one exemplary embodiment of the present invention.

FIGS. 2 and 3 are a cross-sectional view and a perspective view illustrating a configuration of a double-sided reflector for a multi-flexible display device having improved image discontinuity at a panel boundary according to one exemplary embodiment of the present invention.

As shown in FIGS. 2 and 3, a double-sided reflector 120 according to the present exemplary embodiment includes concave mirrors 121a and 121b formed on both surfaces thereof, which face bent portions 111 at panel boundaries between flexible panels 110, thereby converting a path of light by reflecting the light output from each of the bent portions at the panel boundaries between the flexible panels.

In this case, according to an additional aspect of the present invention, the bent portions 111 at the panel boundaries between the flexible panels 110 may be implemented to be positioned outside a focal point of the concave mirrors 121a and 121b formed on both surfaces of the double-sided reflector such that image inversion occurs.

Figure 4:
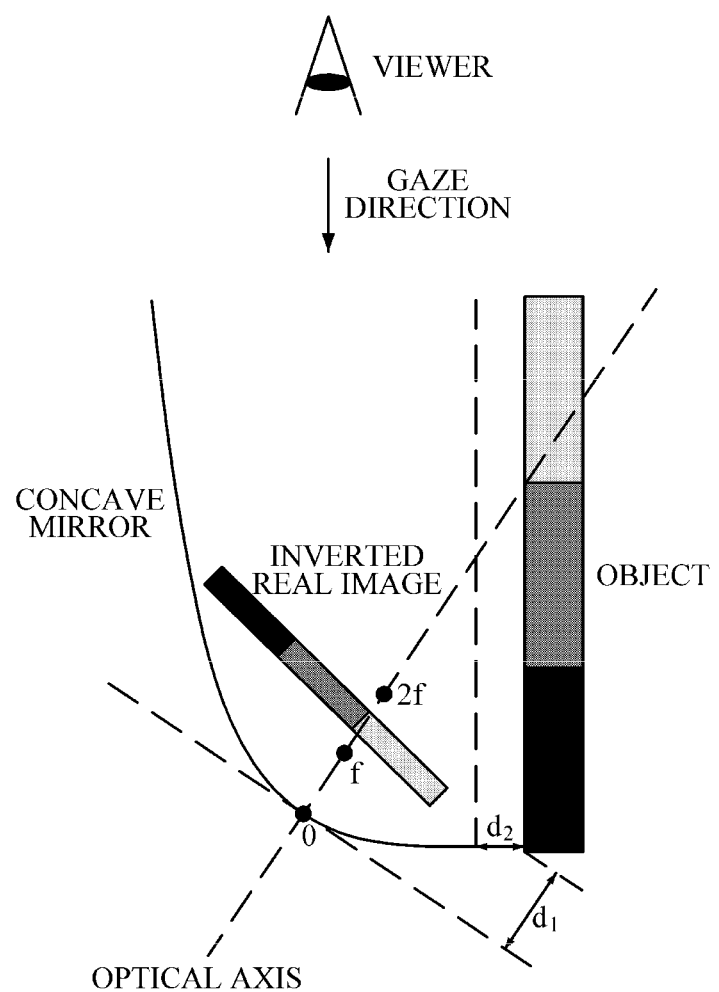
FIG. 4 is a view illustrating that an inverted real image is formed by a concave mirror formed on each of both surfaces of the double-sided reflector for a multi-flexible display device having improved image discontinuity at a panel boundary according to the present invention.

FIG. 4 is a view illustrating that an inverted real image is formed by the concave mirror formed on each of both surfaces of the double-sided reflector for a multi-flexible display device having improved image discontinuity at a panel boundary according to the present invention. As shown in FIG. 4, when an object is positioned outside a focal point of the concave mirror, in the concave mirror, an inverted real image of an uninverted object is not inverted, appears smaller than the object.

In a concave mirror, when an object is positioned between a focal point and a center of curvature, an inverted real image appears larger than the object, when an object is positioned outside the center of curvature, a diminished inverted real image appears smaller than the object, when an object is positioned at the center of curvature, an inverted real image having at the same size as the object appears at the same position as the object, and when an object is positioned at an infinite distance from a mirror surface, an image of the object appears as one point at the focal point.

Therefore, in order that an image, which is output from the bent portion 111 at the panel boundary between the flexible panels 110 and reflected and output by the concave mirror 121a or 121b of the double-sided reflector 120, is not inverted from the viewer's point of view, the bent portion 111 at the panel boundary between the flexible panels 110 should be positioned outside the focal point of the concave mirror 121a or 121b formed on each of both surfaces of the double-sided reflector.

In addition, according to an additional aspect of the present invention, the bent portion 111 at the panel boundary between the flexible panels 110 may be implemented not to be positioned at the focal point of the concave mirror 121a or 121b formed on each of both surfaces of the double-sided reflector 120 such that image divergence does not occur.

This is because when an object is positioned at a focal point of a concave mirror, an image is not formed and diverges. Accordingly, the bent portion 111 at the panel boundary between the flexible panels 110 should not be positioned at the focal point of the concave mirror 121a or 121b formed on each of both surfaces of the double-sided reflector 120.

Meanwhile, according to an additional aspect of the present invention, one ends of the concave mirrors 121a and 121b formed on both surfaces of the double-sided reflector 120 may be implemented to be in contact with each other such that image discontinuity does not occur.

When the one ends of the concave mirrors 121a and 121b formed on both surfaces of the double-sided reflector 120 are not in contact with each other and have a specific interval therebetween, an image is discontinuous due to the interval, resulting in an image discontinuity phenomenon. Accordingly, the one ends of the concave mirrors 121a and 121b formed on both surfaces of the double-sided reflector 120 should be manufactured to be in contact with each other.

Meanwhile, according to an additional aspect of the present invention, the other ends of the concave mirrors 121a and 121b formed on both surfaces of the double-sided reflector 120 may be implemented to be in close contact with ends of light-emitting surfaces of the bent portions 111 at the panel boundaries such that image blur due to movement does not occur.

When the other ends of the concave mirrors 121a and 121b formed on both surfaces of the double-sided reflector 120 are not in close contact with the ends of the light-emitting surfaces of the bent portions 111 at the panel boundaries, the double-sided reflector 120 between the flexible panels 110 is moved by an external force or the like. Thus, a path of light, which is reflected by the concave mirrors 121a and 121b formed on both surfaces of the double-sided reflector 120, is shaken, resulting in the occurrence of image blur.

Therefore, in order to prevent such image blur, the other ends of the concave mirrors 121a and 121b formed on both surfaces of the double-sided reflector 120 should be in close contact with the ends of the light-emitting surfaces of the bent portions 111 at the panel boundaries.

Figure 5:
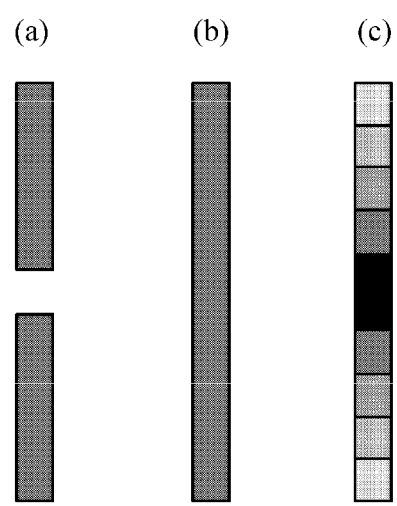
FIG. 5 shows views illustrating a luminance distribution by the double-sided reflector for a multi-flexible display device having improved image discontinuity at a panel boundary according to the present invention.

FIG. 5 shows views illustrating a luminance distribution by the double-sided reflector for a multi-flexible display device having improved image discontinuity at a panel boundary according to the present invention. FIG. 5 (a) illustrates a luminance distribution when the double-sided reflector is not used, FIG. 5 (b) illustrates a luminance distribution when the double-sided reflector is used, and FIG. 5 (c) illustrates a pixel image when the double-sided reflector is used.

In the case of FIG. 5 (a) in which the double-sided reflector is not used, it can be seen that an image discontinuity phenomenon appears at a panel boundary. However, when the double-sided reflector is used, as shown in FIGS. 5 (b) and 5 (c), it can be seen that an image discontinuity phenomenon does not appear at a panel boundary.

Conventionally, an image discontinuity phenomenon at a boundary between panels has been ameliorated through a method in which light in a display area is refracted to a non-display area by installing an optical refractor such as a lens or a prism at a bezel at a boundary between panels, a method in which light in a display area is propagated to a non-display area through an optical waveguide, or a method in which a width of a bezel is physically reduced through miniaturization of wiring or the like.

However, the physical reduction in the width of the bezel has a limitation in a process, the use of the optical waveguide requires high process costs, and the use of the optical refractor such as the lens or the prism greatly limits a range of a viewing angle.

Meanwhile, until now, technology for ameliorating an image discontinuity phenomenon at a boundary between panels has been applied only in a flat panel display, but there has been no technological attempt to ameliorate an image discontinuity phenomenon in a large-area flexible display manufactured by tiling a plurality of flexible displays including a bendable panel, such as a curved display in which a panel boundary forms a curved surface and a rollable display in which a panel is wound on a roller.

However, due to such implementation, according to the present invention, an image discontinuity phenomenon at a boundary between panels of a multi-flexible display device manufactured by tiling a plurality of flexible displays including a bendable panel may be easily and simply ameliorated using a double-sided reflector of which manufacturing processes and manufacturing costs are less expensive than those of an optical refractor such as an optical waveguide, a lens, or a prism.

A method of manufacturing the above-described double-sided reflector for a multi-flexible display device having improved image discontinuity at a panel boundary according to the present invention will be described with reference to FIGS. 6 and 7.

Figure 6:
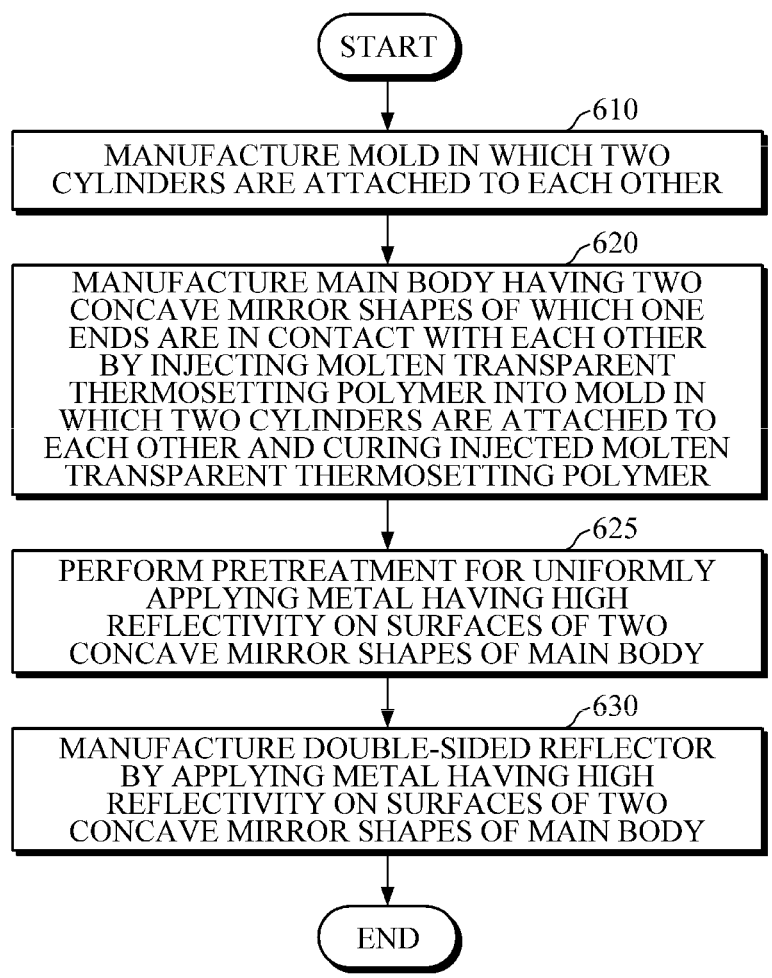
FIG. 6 is a flowchart illustrating a configuration of a method of manufacturing a double-sided reflector for a multi-flexible display device having improved image discontinuity at a panel boundary according to one exemplary embodiment of the present invention.
Figure 7:
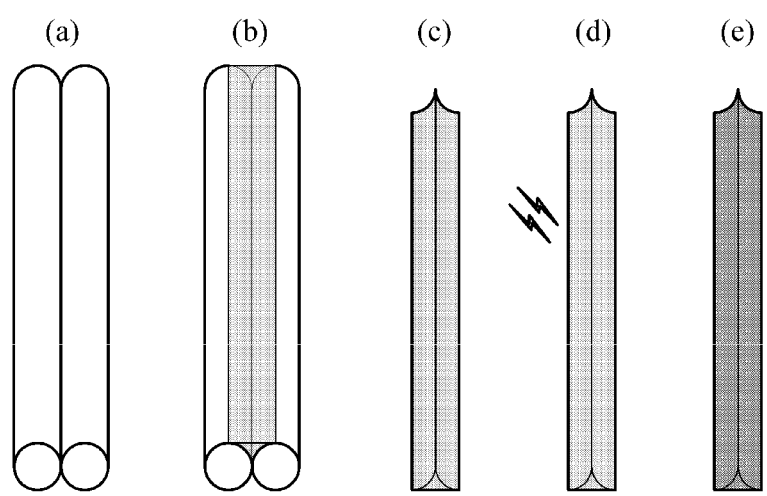
FIG. 7 shows views illustrating processes of manufacturing the double-sided reflector for a multi-flexible display device having improved image discontinuity at a panel boundary according to the present invention.

FIG. 6 is a flowchart illustrating a configuration of the method of manufacturing the double-sided reflector for a multi-flexible display device having improved image discontinuity at a panel boundary according to one exemplary embodiment of the present invention, and FIG. 7 shows views illustrating processes of manufacturing the double-sided reflector for a multi-flexible display device having improved image discontinuity at a panel boundary according to the present invention.

First, as shown in FIG. 6, in a mold manufacturing operation 610, a mold in which two cylinders are attached to each other is manufactured. In this case, the two cylinders may be made of a metal material having a melting point that is higher than that of a molten transparent thermosetting polymer which is a material of a main body of the double-sided reflector to be manufactured.

When the mold is manufactured by attaching the two cylinders to each other, as shown in FIG. 7 (*a*), an inner bottom of the mold, in which the two cylinders are attached to each other, has two concave mirror shapes in which surfaces thereof are concave and concave ends thereof are in contact with each other.

Next, in a main body manufacturing operation 620, a molten transparent thermosetting polymer is injected into the mold, in which the two cylinders are attached to each other, manufactured in the mold manufacturing operation 610 and then is cured to manufacture the main body having the two concave mirror shapes of which one ends are in contact with each other. In this case, glass or the like may be used instead of the transparent thermosetting polymer, but the present invention is not limited thereto.

FIG. 7 (*b*) illustrates that the molten transparent thermosetting polymer is injected into the mold in which the two cylinders are attached to each other. FIG. 7 (*c*) illustrates the main body, which has the two concave mirror shapes of which one ends are in contact with each other, manufactured by injecting the molten transparent thermosetting polymer into the mold, in which the two cylinders are attached to each other, and then curing the molten transparent thermosetting polymer.

Next, in a double-sided reflector manufacturing operation 630, a metal having high reflectivity is applied on surfaces of the two concave mirror shapes of the main body manufactured in the main body manufacturing operation 620 to manufacture the double-sided reflector. In this case, the metal having high reflectivity may be aluminum (Al) but is not limited thereto, and silver (Ag) or the like may also be used.

For example, in the double-sided reflector manufacturing operation 630, the double-sided reflector may be implemented by being manufactured by applying a metal having high reflectivity on the surfaces of the two concave mirror shapes of the main body through thermal evaporation or applying a metal ink having high reflectivity on the surfaces of the two concave mirror shapes of the main body through dip coating.

Meanwhile, according to an additional aspect of the present invention, the method of manufacturing the double-sided reflector for a multi-flexible display device having improved image discontinuity at a panel boundary may further include a pretreatment operation 625.

In the pretreatment operation 625, before the metal having high reflectivity is applied on the surfaces of the two concave mirror shapes of the main body manufactured in the main body manufacturing operation 620, pretreatment for uniformly applying the metal having high reflectivity is performed.

For example, in the pretreatment operation 625, an oxygen plasma treatment is implemented to be performed on the surfaces of the two concave mirror shapes of the main body such that the metal having high reflectivity is uniformly applied when being applied on the surfaces of the two concave mirror shapes of the main body later. In this case, when the oxygen plasma treatment is performed, there is an effect of removing foreign matter on the surfaces of the two concave mirror shapes.

The surfaces of the two concave mirror shapes of the main body manufactured in the main body manufacturing operation 620 may be contaminated due to foreign matter being attached thereto. When the foreign matter attached to the surfaces of the two concave mirror shapes of the main body is not removed, reflectivity may be affected.

Therefore, before the metal having high reflectivity is applied on the surfaces of the two concave mirror shapes of the main body, the oxygen plasma treatment removes the foreign matter attached to the surfaces of the two concave mirror shapes and at the same time, allows the metal having high reflectivity to be uniformly applied when being applied on the surfaces of the two concave mirror shape of the main body.

FIG. 7 (*d*) illustrates that the oxygen plasma treatment is performed on the surfaces of the two concave mirror shapes of the main body, and FIG. 7 (*e*) is a view illustrating the double-sided reflector manufactured by applying the metal having high reflectivity on the surfaces of the two concave mirror shapes.

Due to such implementation, according to the present invention, it is possible to manufacture a double-sided reflector for a multi-flexible display device through a simple process and at low cost, wherein the double-sided reflector is installed at a boundary between panels of a multi-flexible display device manufactured by tiling a plurality of flexible displays including a bendable panel and ameliorates an image discontinuity phenomenon at the boundary between the panels.

As described above, according to the present invention, an image discontinuity phenomenon at a boundary between panels of a multi-flexible display device manufactured by tiling a plurality of flexible displays including a bendable panel may be easily and simply ameliorated using a double-sided reflector capable of being manufactured through a simple process and at low cost, thereby achieving the above objects of the present invention.

According to the present invention, an image discontinuity phenomenon at a boundary between panels of a multi-flexible display device manufactured by tiling a plurality of flexible displays including a bendable panel can be easily and simply ameliorated using a double-sided reflector capable of being manufactured through a simple process and at low cost.

The various exemplary embodiments disclosed in the present specification and the drawings have been presented to help comprehension of the present invention, and are not intended to limit the scope of various exemplary embodiments of the present invention.

Therefore, it should be construed that, in addition to the exemplary embodiments disclosed herein, all modifications and changes or modified and changed forms derived from the technical idea of various exemplary embodiments of the present invention fall within the scope of the various exemplary embodiments of the present invention.

What is claimed is:

1. A multi-flexible display device having improved image discontinuity at a panel boundary, comprising:
   a plurality of flexible panels spaced apart from each other and tiled such that bent portions at panel boundaries are opposite to each other; and
   a double-sided reflector disposed between the plurality of flexible panels and configured to convert a path of light output from each of the bent portions at the panel boundaries between the tiled flexible panels to ameliorate an image discontinuity phenomenon at the panel boundaries between the plurality of tiled flexible panels,
   wherein the double-sided reflector includes concave mirrors formed on both surfaces thereof, which face the bent portions at the panel boundaries between the flexible panels, and converts the path of light by reflecting the light output from each of the bent portions at the panel boundaries between the flexible panels, and
   wherein the bent portion at the panel boundary between the flexible panels is positioned outside a focal point of the concave mirror formed on each of the both surfaces of the double-sided reflector so that image inversion occurs.

2. The multi-flexible display device of claim 1, wherein the bent portion at the panel boundary between the flexible panels is not positioned at a focal point of the concave mirror formed on each of the both surfaces of the double-sided reflector so that an image divergence does not occur.

3. The multi-flexible display device of claim 1, wherein one ends of the concave mirrors formed on the both surfaces of the double-sided reflector are in contact with each other so that image discontinuity does not occur.

4. The multi-flexible display device of claim 3, wherein the other ends of the concave mirrors formed on the both surfaces of the double-sided reflector are in close contact with ends of light-emitting surfaces of the bent portions at the panel boundaries so that image blur due to movement does not occur.

* * * * *